(12) United States Patent
Slutckii et al.

(10) Patent No.: US 12,289,226 B2
(45) Date of Patent: Apr. 29, 2025

(54) ANOMALY DETECTION FOR NETWORK DEVICES USING INTENT-BASED ANALYTICS

(71) Applicant: Juniper Networks, Inc., Sunnyvale, CA (US)

(72) Inventors: Aleksei Slutckii, Saratov (RU); Diheng Qu, Palo Alto, CA (US); Chi Fung Michael Chan, Mountain View, CA (US); Atul Bhaskarrao Patil, San Ramon, CA (US); Georgy Savostyanov, Schiphol-Rijk (NL); Ilia Kharin, Amsterdam (NL)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/003,300

(22) PCT Filed: Jun. 22, 2022

(86) PCT No.: PCT/RU2022/000192
§ 371 (c)(1),
(2) Date: Dec. 23, 2022

(87) PCT Pub. No.: WO2023/249507
PCT Pub. Date: Dec. 28, 2023

(65) Prior Publication Data
US 2024/0275707 A1    Aug. 15, 2024

(51) Int. Cl.
*H04L 43/50*    (2022.01)
*H04L 41/22*    (2022.01)
*H04L 43/062*    (2022.01)

(52) U.S. Cl.
CPC .............. *H04L 43/50* (2013.01); *H04L 41/22* (2013.01); *H04L 43/062* (2013.01)

(58) Field of Classification Search
None
See application file for complete search history.

(56) References Cited

U.S. PATENT DOCUMENTS 10,200,248 B1    2/2019    Jiang et al.
10,516,761 B1    12/2019   A et al.
(Continued)

FOREIGN PATENT DOCUMENTS

WO    2022000398 A1    1/2022

OTHER PUBLICATIONS

International Search Report and Written Opinion of International Application No. PCT/RU2022/000192 dated Mar. 9, 2023, 10 pp.
(Continued)

*Primary Examiner* — June Sison
(74) *Attorney, Agent, or Firm* — Shumaker & Sieffert, P.A.

(57) ABSTRACT

A controller device includes one or more processors and a memory for storing instructions that, when executed, cause the one or more processors to receive, from a set of network devices in a network, a time series of telemetry data; determine, using telemetry data, a threshold for a parameter of a network device of the set of network devices; in response to reception of an indication that an instant value for the parameter does not satisfy the determined threshold for the parameter, determine that an anomaly has occurred at the network device; in response to the determination, generate a user interface having first data for a first time period that occurs before the anomaly, second data for a second time period corresponding to when the anomaly occurs in the network, and third data for a third time period that occurs after the anomaly.

20 Claims, 6 Drawing Sheets

(56) References Cited

U.S. PATENT DOCUMENTS

| | | | |
|---|---|---|---|
| 2011/0153236 A1* | 6/2011 | Montreuil | G01R 31/088 |
| | | | 702/58 |
| 2017/0310697 A1* | 10/2017 | Lefebvre | H04L 43/0888 |
| 2018/0219889 A1 | 8/2018 | Oliner et al. | |
| 2019/0050515 A1* | 2/2019 | Su | G06N 3/045 |
| 2019/0182119 A1* | 6/2019 | Ratkovic | H04L 43/06 |
| 2019/0372827 A1* | 12/2019 | Vasseur | H04L 41/0609 |
| 2020/0021607 A1 | 1/2020 | Muddu et al. | |
| 2021/0243094 A1* | 8/2021 | Holness | H04L 41/0654 |

OTHER PUBLICATIONS

Bjorklund, "Yang—A Data Modeling Language for the Network Configuration Protocol (NETCONF)," Internet Engineering Task Force (IETF), RFC 6020, Oct. 2010, 173 pp.

ENNS, "NETCONF Configuration Protocol," Network Working Group, RFC 4741, Dec. 2006, 95 pp.

Harrington et al., "An Architecture for Describing Simple Network Management Protocol (SNMP) Management Frameworks," Network Working Group, RFC 3411, Dec. 2002, 64 pp.

International Preliminary Report on Patentability from International Application No. PCT/RU2022/000192 dated Jan. 2, 2025, 9 pp.

* cited by examiner

ANOMALY DETECTION FOR NETWORK DEVICES USING INTENT-BASED ANALYTICS

This application is a national stage entry of International Patent Application No. PCT/RU2022/000192, filed 22 Jun. 2022, the entire contents of which is incorporated herein by reference.

TECHNICAL FIELD

The disclosure relates to computer networks, and more particularly, to anomaly detection for devices in a computer network.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication. In some cases, a computer network may be implemented in a data center having hundreds or even thousands of network devices that are part of the network.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating characteristics, telemetry data, system logs, information related to network connectivity, network activity or other status information from the devices as well as view and react to event information received from the devices.

SUMMARY

In general, this disclosure describes techniques for detecting anomalies in the operation of network devices in a network. A network management system (NMS) device, also referred herein as a controller or controller device, may be configured to receive telemetry data from the network devices. The NMS can analyze the telemetry data received over time (e.g., one month) to determine baseline levels for various operating characteristics such as operating temperature, power consumption, voltage levels, current draw levels, etc. Baselines for the operating characteristics may be established for individual devices or for groups of network devices. Such groups may include, for example, network devices in a particular area (e.g., a location of a data center), network devices from the same vendor, network devices that are the same make and/or model, etc. Once the baseline levels for the telemetry data is determined, the NMS can automatically set threshold values for the parameters. The NMS can detect an anomaly when current network device operating characteristics vary from the baseline by failing to satisfy a threshold. In response to detecting the anomaly, the NMS can present a network administrator or other user with telemetry data for the device for a time period before the anomaly occurred, a time period when the anomaly occurred, and a time period after the anomaly occurred. The presentation of such data can assist a network administrator or other user in determining whether the anomaly indicates that the network device needs to be replaced, or if the anomaly is merely a transient event. Additionally, the NMS can determine a risk that the anomaly poses based on the number of other network devices that would be affected should the network device experiencing the anomaly fail.

The techniques disclosed herein may be implemented in a practical application such as a network management system that provides advantages over existing systems. Many networking devices may have operating thresholds "hardcoded" into the hardware or firmware of the device. For example, an optical transceiver of a network device may have hardcoded values representing temperature and voltage threshold values etc. that are fixed and hardcoded into the optical transceiver. Existing systems may use these hardcoded values to generate overvoltage warning, overtemperature warnings, and other warnings when threshold values are exceeded. However, manufacturers may not select optimal threshold values, particularly in light of the various uses and configurations of the network devices. Additionally, the hardcoded values may represent values at which the device may totally fail, giving no warning to the user of conditions that may indicate the device is still operational, but may be about to fail. Further, the network administrator may only be notified of the anomaly and may not be presented with relevant information, such as telemetry data before, during, and after the anomaly and/or potentially impacted devices. As an example, an optical transceiver may begin to exhibit anomalous behavior at temperatures lower than that indicated by the manufacturer. This anomalous behavior may cause network operations to violate service level agreement (SLA) parameters. Using the techniques disclosed herein, a network management system can alert a network administrator to anomalous behavior of a network device well before the network device exceeds hardcoded thresholds, and before SLA parameters are violated, and before the device experiences total failure, thereby providing a technical advantage over existing systems. For example, the NMS can detect that operating characteristics of a network device are beginning to vary from an established baseline, and provide an alert to a network administrator that the network device is exhibiting anomalous behavior. The network administrator may be alerted to such anomalous behavior that may indicate to the network administrator that a network device needs to be replaced prior to potential total failure, thereby avoiding SLA violations.

Additionally, according to techniques disclosed herein, a network administrator may be presented with information regarding the operation of the network device before and after anomalous behavior is detected. As an example, a network administrator may be presented with information regarding operating temperature, voltage levels, current levels etc. both before, during, and after the anomalous behavior was detected. The network administrator may utilize this information to better determine if the anomalous behavior of the network device is transient, or if the anomalous behavior is becoming persistent, thereby indicating the network device may need reconfiguration, repair, or replacement.

Further, according to the techniques disclosed herein, the network administrator can be presented with a report that can be in a list format or graph format, indicating other network components that may be affected by a failure in the network device exhibiting anomalous behavior, thereby indicating the impact that a failure of the network device would have on the overall network. This can help the network administrator gauge the risk associated with a potential failure and to prioritize remedial actions accordingly.

In one example, this disclosure describes a system that includes a memory storing a database of a time series of telemetry data received from a set of network devices of a network; and one or more processors coupled to the memory; wherein the memory stores instructions that, when executed, cause the one or more processors to: determine, using the time series of telemetry data received from the set of network devices, a threshold for a parameter of a network device of the set of network devices; in response to receiving an indication that an instant value for the parameter does not satisfy the determined threshold for the parameter, determine that an anomaly has occurred at the network device; in response to determining that an anomaly has occurred at the network device, generate first data for a first time period that occurs before the anomaly, second data for a second time period corresponding to when the anomaly occurs in the network, and third data for a third time period that occurs after the anomaly; generate data representing a user interface using the first data, the second data, and the third data; and output, for display, the data representing the user interface.

In another example, this disclosure describes a method that includes receiving, from a set of network devices in a network, a time series of telemetry data; determining, using the time series of telemetry data received from the set of network devices, a threshold for a parameter of a network device of the set of network devices; in response to receiving an indication that an instant value for the parameter does not satisfy the determined threshold for the parameter, determining that an anomaly has occurred at the network device; in response to determining that an anomaly has occurred at the network device, generating first data for a first time period that occurs before the anomaly, second data for a second time period corresponding to when the anomaly occurs in the network, and third data for a third time period that occurs after the anomaly; generating data representing a user interface using the first data, the second data, and the third data; and outputting, for display, the data representing the user interface.

In a further example, this disclosure describes a computer-readable storage medium having stored thereon instructions that, when executed, cause one or more processors to: receive, from a set of network devices in a network, a time series of telemetry data; determine, using the time series of telemetry data received from the set of network devices, a threshold for a parameter of a network device of the set of network devices; in response to reception of an indication that an instant value for the parameter does not satisfy the determined threshold for the parameter, determine that an anomaly has occurred at the network device; in response to a determination that an anomaly has occurred at the network device, generate first data for a first time period that occurs before the anomaly, second data for a second time period corresponding to when the anomaly occurs in the network, and third data for a third time period that occurs after the anomaly; generate data representing a user interface using the first data, the second data, and the third data; and output, for display, the data representing the user interface.

The details of one or more examples are set forth in the accompanying drawings and the description below. Other features, objects, and advantages will be apparent from the description and drawings, and from the claims.

DETAILED DESCRIPTION

Figure 1:
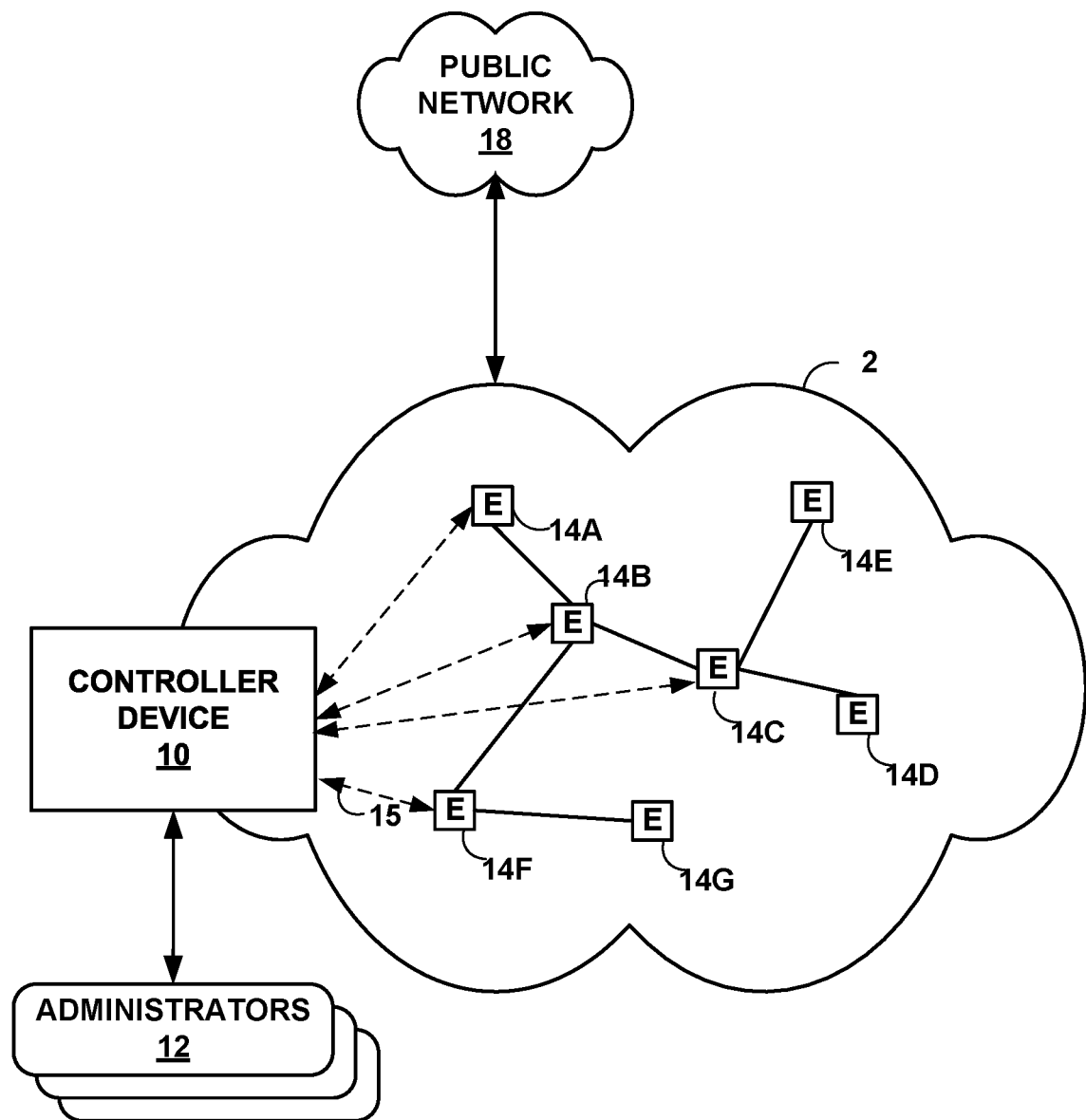
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices 14) may include, for example, routers, switches, gateways, bridges, hubs, access points, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, network devices within enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10 may comprise, for example, a cluster of virtual machines. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage and monitor the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 can be centrally maintained by an IT group of the enterprise. Administrator 12 interacts with controller device 10 to remotely configure, monitor, and analyze elements 14. For example, administrator 12 may receive alerts from controller device 10 regarding any of elements 14. The alerts may include alerts regarding anomalous operation of one or more of elements 14 that is detected using the techniques described herein. Administrator 12 may also view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F or to directly query operating characteristics for element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 can use controller device 10 to configure elements 14 to specify certain operational characteristics that further the objectives of administrator 12. For example, administrator 12 may specify for an element 14 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed elements 14, such as the SNMP protocol or the Network Configuration Protocol (NETCONF) protocol or a derivative thereof such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user configuration of devices may be referred to as "intents." An intent-based networking system may help to allow administrators to describe the intended network/compute/storage state. In some aspects, user intents can be categorized as business policies or stateless intents. Business policies, or stateful intents, may be resolved based on the current state of a network. Stateless intents may be fully declarative ways of describing an intended network/compute/storage state, without concern for a current network state.

In some aspects, stateful intents may include intents with respect to anomaly detection within the network. Such intents may be referred to as anomaly detection intents. As an example, an administrator may express an intent that the system reports an anomaly with respect to a network device if an operating characteristic of the network device varies from a baseline value established as described herein by more than a user-specified threshold. The intent may be applied to a single network device or groups of network devices. Examples of such groups include network devices of the same make and model, network devices from the same vendor, network device in the same area, etc.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges that indicate relationships between the nodes. Controller devices may model intent data models as unified graphs, so that the intent models can be represented as connected. In this manner, business policies can be implemented across intent data models. When intents are modeled using a unified graph model, extending new intent support can involve extending the graph model and compilation logic.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CON- FIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, read, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. A network administrator may use declarative intents that are represented in the data model. Use of such declarative intents may ease the management of networks. To realize intents, controller device 10 may attempt to select optimal resources from elements 14 and/or from other devices.

In general, controller device 10 may be configured to translate a high-level configuration and/or anomaly detection intents to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with techniques of the disclosure, controller device 10 may be configured to obtain telemetry data from elements 14. In some aspects, the telemetry data can be operating temperature data, voltage data, current draw data, or other operating characteristics regarding the operation of elements 14. Other characteristics that may be collected are transmitted/received bytes/packets which indicates traffic volume, error packet count, e.g., cyclic redundancy check (CRC), frame check sequence (FCS), etc., which may indicate deteriorating operating state. Controller device 10 may analyze and use the telemetry data in various ways. During an initial baseline establishment period, controller device 10 may collect and store the telemetry data. In some aspects, the baseline establishment period may be thirty days. At the end of the baseline establishment period, controller device may determine baseline values for various parameters in the telemetry data such as a baseline temperature, baseline voltage, baseline current draw, etc. Baseline values may be established for individual network devices or groups of network devices. For example, baseline values may be established for network devices from the same manufacturer, network devices that are the same make and/or model, network devices that are in the same general area of a data center, network devices that are configured with the same software (operating system, applications, etc.) or other groupings. After baseline values for the various parameters have been established, controller device 10 may continue to receive telemetry data from elements 14. Controller device 10 can compare the currently received telemetry data with the baseline data, and using threshold values determined according to anomaly detection intent provided by an administrator, determine if a network device of elements 14 is operating anomalously.

Figure 2:
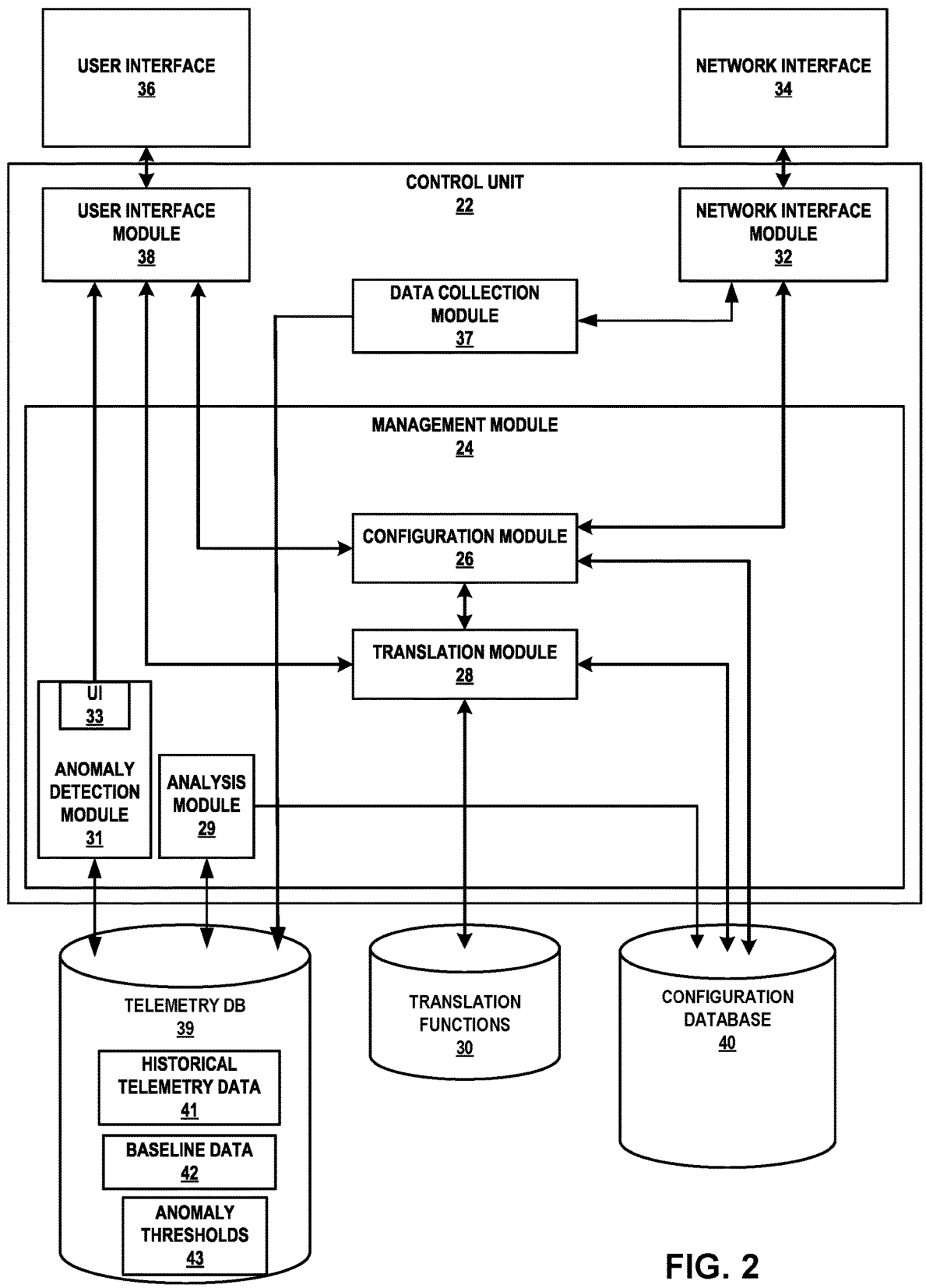
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, data collection module 37, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, data collection module 37 and management module 24 may again be implemented as respective hardware units, or in software or firmware, or a combination thereof.

In accordance with the techniques of the disclosure, control unit 22 can execute data collection module 37 to obtain telemetry data from network devices, e.g., elements 14 (FIG. 1). Data collection module 37 may store the telemetry data in telemetry database (DB) 39 as a time series of telemetry data. Data collection module 37 can obtain telemetry data from network devices using a "push" model or a "pull" model. In the push model, a network device (e.g., an agent on a network device), is configured to periodically send telemetry data to data collection module 37. In the pull model, data collection module 37 periodically requests that the network device (e.g., the agent on the network device) provide the telemetry data to data collection module 37. The service interval can be configurable depending on what kind of telemetry data is being collected. As an example, data may be collected every five seconds for optical transceivers. Data collection module 37 may store telemetry data obtained during the baseline establishment period as historical telemetry data 41. In addition to storing the telemetry data, data collection module 37 may store a timestamp in association with the telemetry data to indicate when the telemetry data was collected.

Control unit 22 executes management module 24 to manage various network devices, e.g., elements 14 of FIG. 1. Management includes, for example, configuring and analyzing the network devices according to instructions received from a user (e.g., administrator 12 of FIG. 1) and providing the user with the ability to submit instructions to configure and analyze the network devices. In this example, management module 24 further includes configuration module 26, translation module 28, analysis module 29, and anomaly detection module 31.

Management module 24 is configured to receive an intent (e.g., a high-level configuration instruction or anomaly detection instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. Further, the user may update anomaly detection instructions over time to change how the analysis module 29 uses telemetry data to detect an anomaly. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 may include a data structure describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 may store current configuration information (e.g., intent data model, or in some cases, both intent data model and low-level configuration information) for the managed devices (e.g., network devices 14). Configuration database 40 may include a database that comprises a unified intent data model.

Management module 24 may maintain a data structure in configuration database 40. The data structure may include a plurality of vertices and a plurality of edges, each vertex of the plurality of vertices representing a respective network device of a plurality of network devices (e.g., elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12. This intent can be translated and configured into the graph data structure.

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example of allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Analysis module 29 may analyze telemetry data in telemetry database 39 to determine baseline data 42. For example, analysis module 29 may analyze a time series of data collected by data collection module 37 and stored as historical telemetry data 41 to determine baseline operating characteristics for temperature, voltage, current draw etc. of a network device. Analysis module 29 can determine multiple sets of baseline data. For example, analysis module 29 can analyze the time series of data do determine baseline operating characteristics for a particular network device or a group of network devices. For example, analysis module 29 can determine baseline operating characteristics for a group of network devices that are from the same vendor, that are the same make and/or model, that are in the same location, etc. Further, analysis module 29 may determine baseline operating characteristics with respect to a time of day, day of week, week of year etc. As an example, a network device (e.g., element 14A of FIG. 1) may communicate more data during working hours of working days when compared to non-working hours and on weekends. As a result, baseline operating temperature, voltage, and/or current parameters may be higher during working hours than during non-working hours. As an additional example, a data center may have different temperature characteristics in different parts of the data center. For example, a data center may have different cooling capacity in different areas of the data center, or there may be more equipment generating heat in some areas of the data center. As a result, network devices in one area of a data center may have different baseline operating temperatures than network devices in a different area of the data center.

In some aspects, the baseline data 42 may be based on a time series of data obtained from historical telemetry data 41 that may be collected over a thirty day period. However, other time periods greater than or less than thirty days are possible. In general, the collection period may be dependent on data storage availability of controller device 10. As new data is collected, analysis module 29 may utilize the new data to recalculate baseline data 42. For example, analysis module 29 may maintain baseline operating characteristics such as a baseline operating temperature or baseline voltage as a moving average of the most recent thirty day period.

Analysis module 29 can determine various parameters from the historical telemetry data 41 to generate baseline data 42 for network devices and groups of network devices. As an example, analysis module 29 may perform statistical analysis to determine various baseline statistical measures associated with the time series of values for operating temperature, voltage, current draw, etc. For example, analysis module 29 may determine average values, standard deviations, quantiles, percentile thresholds, probability density function, etc. Analysis module 29 can use the baseline statistical values to determine anomaly thresholds for various parameters associated with network devices and groups of network devices. The threshold may set a lower bound and/or an upper bound for an operating characteristic. Analysis module 29 can also perform regression analysis on the time series data to determine relationships between operating characteristics, and trends in the values of operating characteristics.

In some aspects, a parameter may be based on a single operating characteristics, such as temperature, voltage, current draw, etc. In some aspects, the parameter may be based on a combination of operating characteristics of the network device. Analysis module 29 can assign a score based on the values of the combination of operating characteristics. Further, analysis module 29 can perform statistical analysis of the scores determined from the time series of historical data. For example, analysis module 29 can determine a score for each set of telemetry data that is collected for a network device over time. Analysis module 29 can then determine average values, standard deviations, quantiles, percentile thresholds, probability density function, etc. for the set of scores. Analysis module 29 can use the baseline statistical values to determine anomaly thresholds for the score with respect to the network device and with respect to groups of network devices. Analysis module 29 can also perform regression analysis on the time series of scores to determine relationships between operating characteristics and the score, and trends in the values of the score.

Based on such statistical analysis, analysis module 29 can determine threshold values for the score that determine that the score is an outlier, and therefore an anomaly. For example, data collection module 37 may determine a score based on a combination of temperature, voltage, and current draw of the network device.

In addition to temperature, voltage and current draw data, data collection module 37 can collect network performance data from the network device such as throughput, error counters, etc. Analysis module 29 can correlate network performance data with the operating characteristics and use the correlations to determine the score. For example, a score may be adjusted higher when the temperature of the network device is abnormally higher than the baseline and error counters (e.g., cyclic redundancy check (CRC) and/or forward error correction (FEC) errors) are increasing.

Anomaly detection module 31 can receive current telemetry data from data collection module 37 and compare the current telemetry data to thresholds in anomaly thresholds 43. If an instant (i.e., most recently obtained) value of a parameter determined from operating characteristics and/or network performance data in the telemetry data for a network device does not satisfy an anomaly threshold for the operating characteristic, anomaly detection module 31 can determine that an anomaly event has occurred with respect to the network device. Anomaly detection module 31 can store anomaly event related data in telemetry database 39. The event related data can include a timestamp of when the event occurred and the type of event (overvoltage, undervoltage, overcurrent, undercurrent, overtemperature, etc.). Anomaly detection module 31 can generate an alert indicating that the anomaly event has occurred. In some aspects, in response to the alert, the anomaly detection unit can output details regarding the alert on a report of network anomalies. In some aspects, in response to the alert, an administrator 12 can request that anomaly detection module 31 generate user interface data 33 to present information regarding an alert event. Anomaly detection module 31 may utilize the timestamp for the alert event to obtain telemetry data for the network device from telemetry database 39. Anomaly detection module 31 may obtain telemetry data for the network device for a first time period occurring before the anomaly was detected, a second time period when the anomaly was detected, and a third time period after the anomaly was detected. The time periods may be set to a default value, or the administrator 12 can specify the time periods to use. Anomaly detection module 31 may present the baseline values for an operating characteristic in addition to the value that caused the anomaly to be detected. For example, anomaly detection module 31 can present the baseline value for the network device characteristics, or a group to which the device belongs, and can present the value that caused the anomaly to be detected. Additionally, anomaly detection unit can present network traffic data flowing through the network device at the time the anomaly occurred.

Anomaly detection module 31 may perform linear regression on the time series database to determine if an operating characteristic for a network device is trending away from the baseline value. If the rate of change exceeds a threshold value, anomaly detection module 31 can indicate an anomaly for the network device exhibiting the trend.

Additionally, anomaly detection module 31 may obtain network graph data from configuration database 40 and utilize the network graph data to assess a risk posed by the anomaly by determining the network devices would be affected should the network device experiencing the anomaly fail completely. An example of such a network graph is provided below in FIG. 4.

Figure 3A:
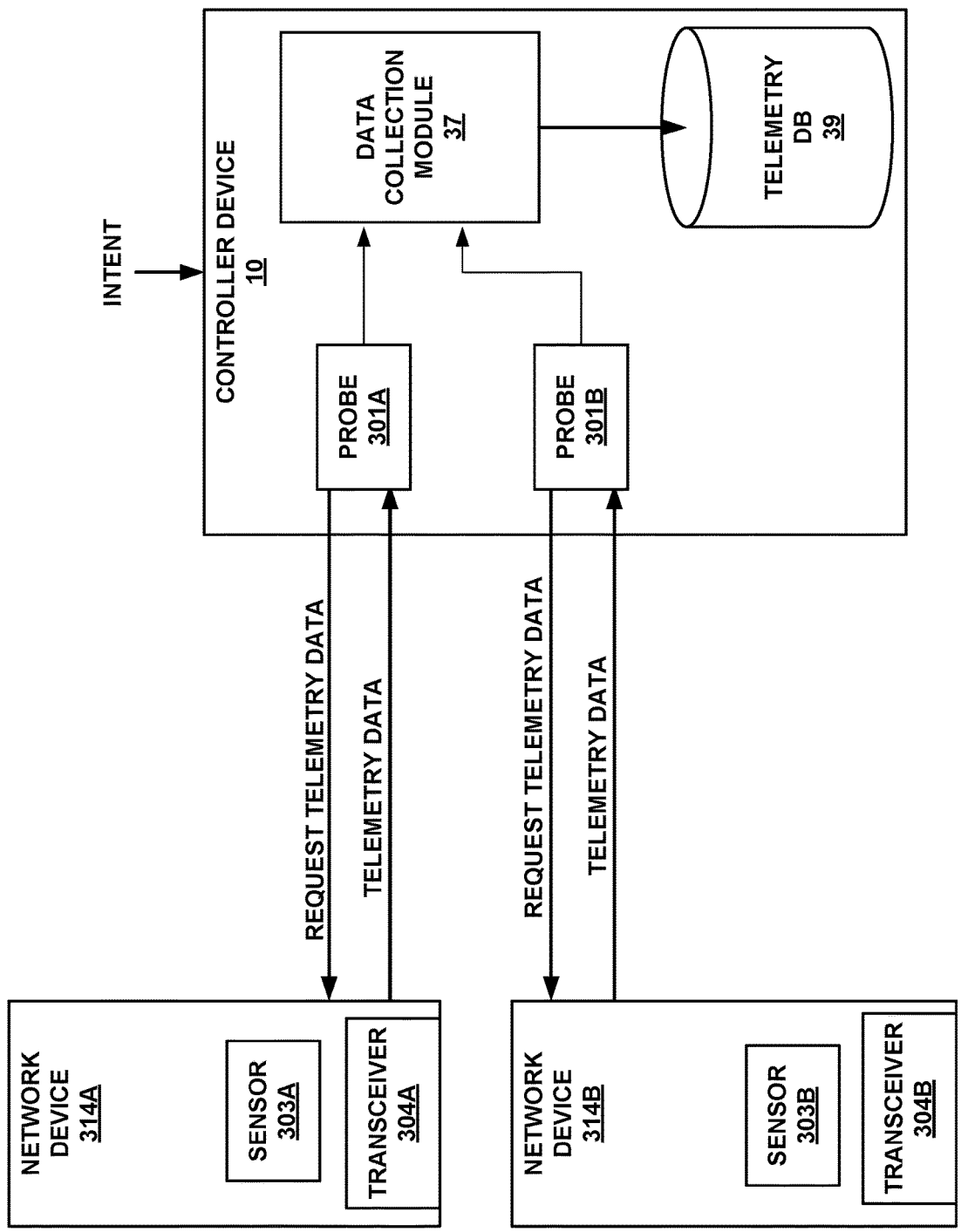
FIGS. 3A and 3B are conceptual diagrams illustrating a network device in communication with a controller in accordance with the techniques of this disclosure.
Figure 3B:
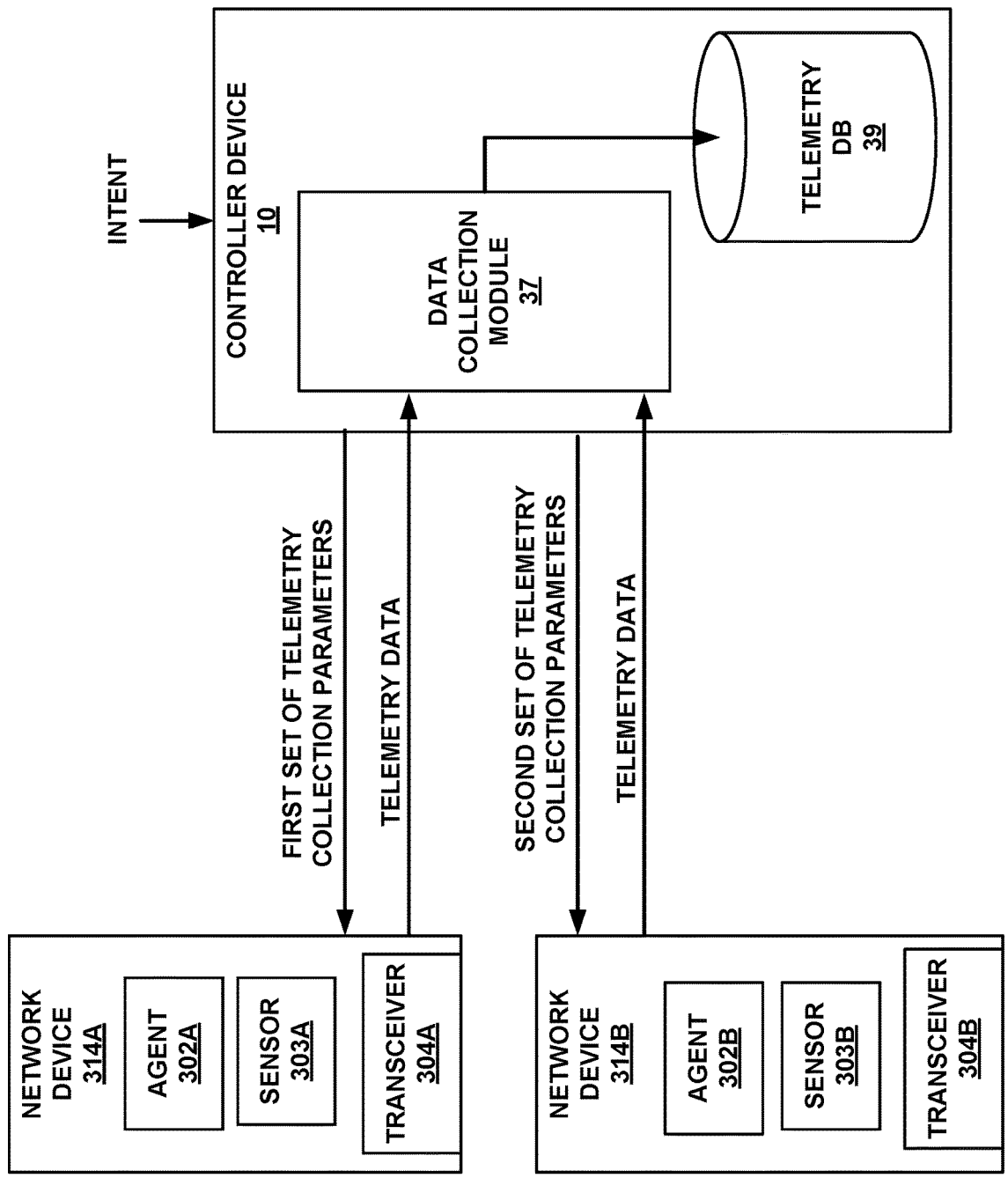

FIGS. 3A and 3B are conceptual diagrams illustrating example network devices in communication with a controller in accordance with the techniques of this disclosure. FIGS. 3A and 3B are discussed in the context of FIGS. 1-2 for example purposes only. Network devices 314A and 314B of FIGS. 3A and 3B may be implementations of elements 14 of FIG. 1. In the example of FIGS. 3A and 3B, network device 314A includes transceiver 50A and network device 314B includes transceiver 50B. In some aspects, transceivers 50A and 50B may be optical transceivers, however, the disclosure is not limited to such transceivers. Network devices 314A and 314B may include sensors 303A and 303 respectively.

In the example of FIG. 3A, data collection module 37 may utilize an intent provided by administrator 12 to determine telemetry data that is to be collected from network devices 314A and 314B. In response to determining, based on the intent, that telemetry data is to be collected from network devices 314A and 314B, data collection module 37 can initiate probes 301A and 301B. A probe 301 is configured to obtain telemetry data from a network device. For example, probe 301A can be configured to use application program interfaces (APIs) or other interfaces provided by network device 314A to obtain telemetry data from network device 314A and probe 301B can be configured use APIs or other interfaces provided by network device 314B to obtain telemetry data from network device 314B. In some aspects, the APIs or other interfaces used by a probe to collect telemetry data may be proprietary to the network device. As an example, many network devices implement a "show" command that can be used to by probes 301A and/or 301B to obtain telemetry data from such network devices. In some aspects, a probe may use a standardized interface such as SNMP to collect telemetry data.

A probe can issue a request to the network device indicating the telemetry data that is being requested. As an example, in response to receiving a request for telemetry data from probe 301A, network device 314A can obtain the requested telemetry data from sensor 303A and/or from transceiver 304A. Similarly, in response to receiving a request for telemetry data from probe 301B, network device 314B may obtain the requested telemetry data from sensor 303B and/or from transceiver 304B. A sensor such as sensor 303A or 303B may be configured to provide temperature data, current data, voltage data etc. Although one sensor 303 and one transceiver 304 are shown for network devices 314A and 314B, a network device 314 may have more than one sensor 303 and/or more than once transceiver 304. After obtaining their respective telemetry data, probes 301A and 301B can provide their respective telemetry data to data collection module 37, which can store the telemetry data in telemetry database 39 along with a timestamp to indicate when the telemetry data was collected.

In the example show in FIG. 3B, data collection module 37 may utilize an intent provided by administrator 12 to determine telemetry data that is to be collected from network devices 314A and 314B. In some aspects, controller device 10 may communicate the type of telemetry data to be collected from network devices 314A and 314B. As an example, controller device 10 may communicate a first set of telemetry collection parameters to agent 302A and a second set of telemetry parameters to agent 302B that inform agents 302A and 302B that they are to collect operating temperatures, operating voltages, operating current etc. from their respective network devices 314A and 314B. Agents 302A and 302B may collect the indicated telemetry data and provide the telemetry data to data collection module 37 for storage as time series data in telemetry database 39. In some aspects, a push model may be used where agents 302A automatically and periodically provide their respective telemetry data to data collection module 37. In some aspects, a pull model may be used where agents 302A and 302B provide their respective telemetry data to data collection module 37 in response to a request received from data collection module 37.

An agent 302 may obtain operating characteristics for inclusion in the telemetry data from various sources. As an example, agent 302A may obtain operating characteristics from sensor 303A and/or from transceiver 304A. Similarly, agent 302B may obtain operating characteristics from sensor 303B and/or from transceiver 304B. After obtaining their respective telemetry data, agents 302A and 302B can provided the telemetry data to data collection module 37, which can store the telemetry data in telemetry database 39 along with a timestamp to indicate when the telemetry data was collected.

Figure 4:
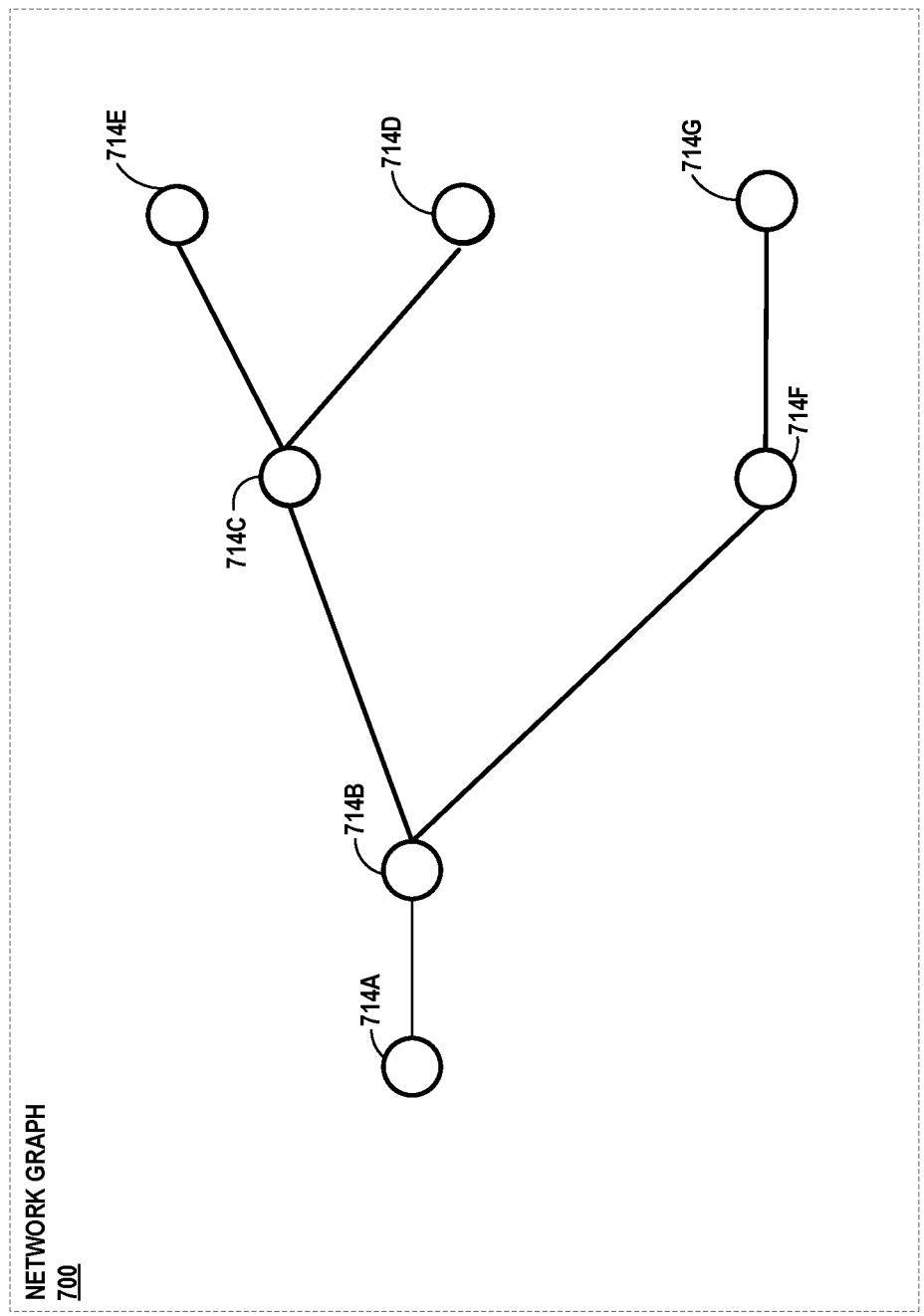
FIG. 4 is a conceptual diagram showing a network graph of the enterprise network of FIG. 1.

FIG. 4 is a conceptual diagram showing a network graph of the enterprise network of FIG. 1. In the graph shown in FIG. 4, nodes 714A-714G correspond to elements 14A-14G of FIG. 1. Node 714A corresponding to element 14A is the root of the graph. From the example shown in FIG. 4, it can be seen node 714B has five downstream nodes 714C-714G. Node 714F has a single downstream node 714G. Thus, a failure of node 714B affects more nodes than a failure of node 714F. Anomaly detection module 31 can use the number of affected nodes to determine a risk factor associated with an anomaly. Thus, in this example, an anomaly at network device 14B, represented by node 714B, poses a higher risk than an anomaly at network device 14F, represented by node 714F. In some aspects, anomaly detection module 31 can generate a graphical representation of the network graph, with nodes experiencing anomaly highlighted in the graphical representation. In some aspects, the graphical representation can highlight nodes posing higher risk differently than nodes posing lower risk of failure (e.g., color coding).

Figure 5:
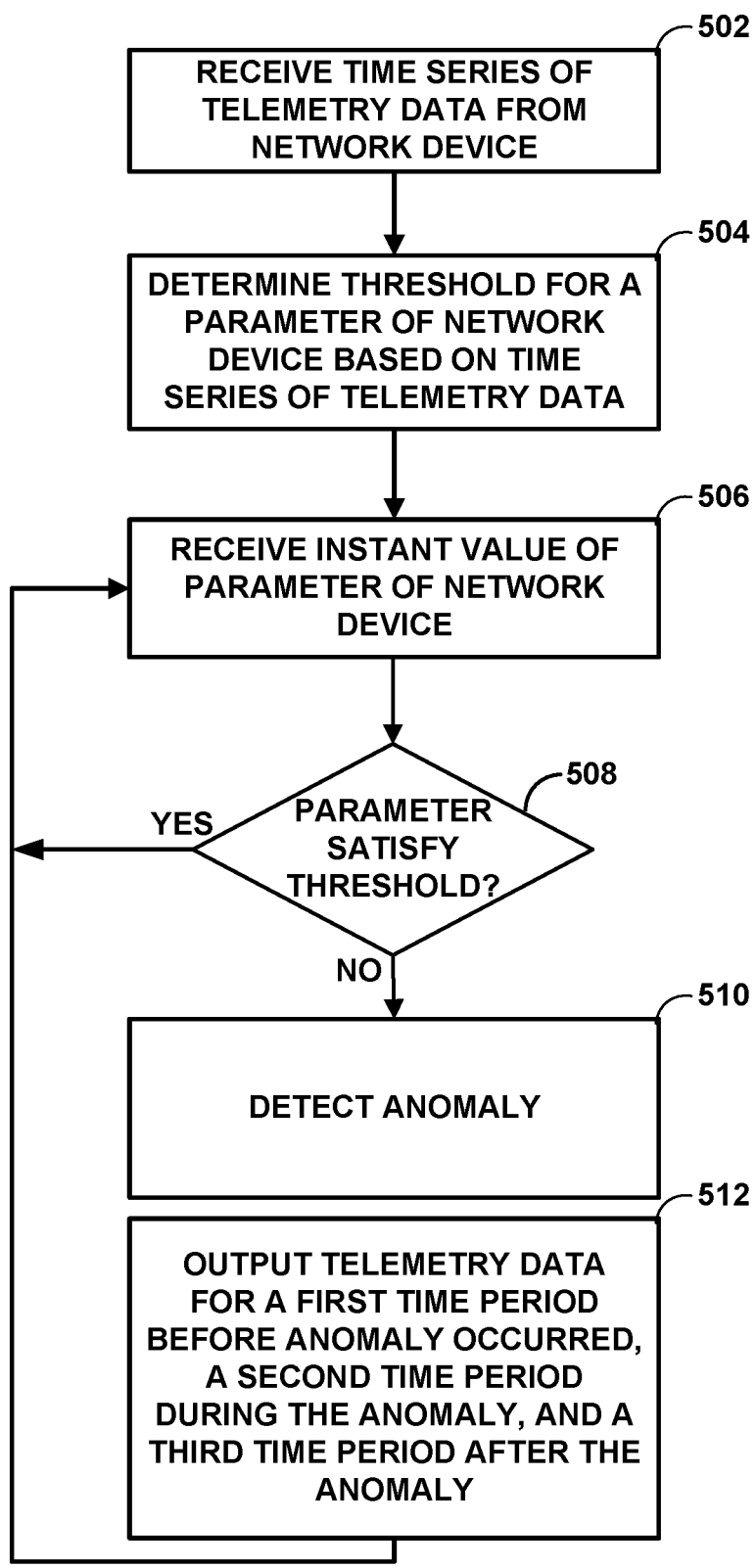
FIG. 5 is a flowchart illustrating operations of a method to perform anomaly detection, in accordance with the techniques of the disclosure.

FIG. 5 is a flowchart illustrating operations of a method to perform anomaly detection, in accordance with the techniques of the disclosure. FIG. 5 is discussed with FIGS. 1, 2, 3A, 3B, and 4 for example purposes only. In some aspects, a controller device of a network system receives a time series of time series of telemetry data from network devices in the network (502). In some aspects, the telemetry data can include operating characteristics such as operating temperature, current draw, and/or voltage. The telemetry data may also include network traffic data such as network throughput and/or network errors. In some aspects, the network device parameter may be a score determined based on a combination of one or more of the operating characteristics, or a combination of the one or more operating characteristics and one or more of the network traffic data parameters.

The controller device can determine, using the telemetry data received from the set of network devices, a threshold for a parameter of a network device of the set of network devices (504). The threshold can be for a single network device or for a group of network devices to which the network device belongs (e.g., network device of the same make and model, network devices in the same area, etc.). In some aspects, the threshold may be determined based on statistical analysis of the time series of data.

The controller device can receive an instant value of the parameter (506). The controller device can determine if the instant value of the parameter satisfies the threshold for the parameter (508). In response to receiving an indication that the instant value for the parameter does not satisfy the determined threshold for the parameter ("NO" branch of 508), the controller device can determine that an anomaly has occurred at the network device (510). The controller can generate first data for a first time period that occurs before the anomaly, second data for a second time period corresponding to when the anomaly occurs in the network, and third data for a third time period that occurs after the anomaly, and output the telemetry data for the first time period, the second time period, and the third time period (512). In some aspects, the controller can store a graph model of the network system. In response to detecting an anomaly, the controller can determine a risk value associated with the anomaly. The risk value may be determined by analyzing the network graph to determine the number of other network devices that will be affected should the network device experiencing the anomaly fail.

If the parameter does satisfy the threshold ("YES" branch of 508), the method can return to 506 to receive new instant values of the parameter.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A system comprising:
memory; and
one or more processors coupled to the memory;
wherein the memory stores instructions that, when executed, cause the one or more processors to:
determine, based on one or more operating characteristics indicated in a time series of telemetry data received from a plurality of network devices of a network, a threshold for a parameter of the plurality of network devices, the one or more operating characteristics comprising one or more of a temperature of the plurality of network devices, a voltage level of the plurality of network devices, a power consumption of the plurality of network devices, or a current draw level of the plurality of network devices;
to based on receiving an indication that an instant value of a particular network device of the plurality of network devices does not satisfy the determined threshold for the parameter of the plurality of network devices, determine that an anomaly has occurred at the particular network device;
based on determining that the anomaly has occurred at the particular network device, generate first data for a first time period that occurs before the anomaly occurs, second data for a second time period corresponding to when the anomaly occurs, and third data for a third time period that occurs after the anomaly occurs;
generate, based on the first data, the second data, and the third data, data representing a user interface; and
output, for display, the data representing the user interface.

2. The system of claim 1, wherein the instructions to determine the threshold for the parameter of the plurality of network devices comprise instructions that cause the one or more processors to determine a score based on at least two of the temperature of the plurality of network devices, the voltage level of the plurality of network devices, the power consumption of the plurality of network devices, or the current draw level of the plurality of network devices.

3. The system of claim 2, wherein the instructions to determine the score comprise instructions that cause the one or more processors to determine the score further based on one or more network traffic data parameters associated with the plurality of network devices.

4. The system of claim 1, wherein the instructions further cause the one or more processors to determine, based on a graph model for the network, one or more network devices of the plurality of network devices that would be affected by a failure of the particular network device where the anomaly occurs, wherein the graph model comprises nodes representing the plurality of network devices and edges representing connections between the nodes.

5. The system of claim 4, wherein the instructions further cause the one or more processors to determine a risk value associated with the anomaly based on the graph model.

6. The system of claim 1, wherein to determine the threshold for the parameter of the plurality of network devices, the instructions cause the one or more processors to determine the threshold for the parameter of the plurality of network devices using a statistical analysis to determine a baseline statistical measurement for at least one of the one or more operating characteristics of the plurality of network devices.

7. The system of claim 1, wherein the particular network device comprises an optical transceiver.

8. A method comprising:
    determining, based on one or more operating characteristics indicated in a time series of telemetry data received from a plurality of network devices, a threshold for a parameter of the plurality of network devices of a network, the one or more operating characteristics comprising one or more of a temperature of the plurality of network devices, a voltage level of the plurality of network devices, a power consumption of the plurality of network devices, or a current draw level of the plurality of network devices;
    based on receiving an indication that an instant value of a particular network device of the plurality of network devices does not satisfy the determined threshold for the parameter of the plurality of network devices, determining that an anomaly has occurred at the particular network device;
    based on determining that the anomaly has occurred at the particular network device, generating first data for a first time period that occurs before the anomaly occurs, second data for a second time period corresponding to when the anomaly occurs in the network, and third data for a third time period that occurs after the anomaly occurs;
    generating, based on the first data, the second data, and the third data, data representing a user interface; and
    outputting, for display, the data representing the user interface.

9. The method of claim 8, wherein determining the threshold for the parameter of the plurality of network devices comprises determining a score based on at least two of the temperature of the plurality of network devices, the voltage level of the plurality of network devices, the power consumption of the plurality of network devices, or the current draw level of the plurality of network devices.

10. The method of claim 9, wherein determining the score is further based on one or more network traffic data parameters associated with the plurality of network devices.

11. The method of claim 8, further comprising:
    determining a graph model for the network, wherein the graph model comprises nodes representing the plurality of network devices and edges representing connections between the nodes; and
    determining, using the graph model, one or more network devices of the plurality of network devices that would be affected by a failure of the particular network device where the anomaly occurs.

12. The method of claim 11, further comprising determining a risk value associated with the anomaly based on the graph model.

13. The method of claim 8, wherein determining the threshold for the parameter of the plurality of network devices comprises determining the threshold for the parameter for the parameter of the plurality of network devices using a statistical analysis to determine a baseline statistical measurement for at least one of the one or more operating characteristics of the plurality of network devices.

14. The method of claim 8, wherein the particular network device comprises an optical transceiver.

15. Non-transitory computer-readable storage media having stored thereon instructions that, when executed, cause one or more processors to:
    determine, based on one or more operating characteristics indicated in a time series of telemetry data received from a plurality of network devices of a network, a threshold for a parameter of the plurality of network devices, the one or more operating characteristics comprising one or more of a temperature of the plurality of network devices, a voltage level of the plurality of network devices, a power consumption of the plurality of network devices, or a current draw level of the plurality of network devices;
    based on reception of an indication that an instant value of a particular network device of the plurality of network devices does not satisfy the determined threshold for the parameter of the plurality of network devices, determine that an anomaly has occurred at the particular network device;
    to based on a determination that the anomaly has occurred at the particular network device, generate first data for a first time period that occurs before the anomaly occurs, second data for a second time period corresponding to when the anomaly occurs in the network, and third data for a third time period that occurs after the anomaly occurs;
    generate, based on the first data, the second data, and the third data, data representing a user interface; and
    output, for display, the data representing the user interface.

16. The non-transitory computer-readable storage media of claim 15, wherein the instructions to determine the threshold for the parameter of the plurality of network devices comprise instructions that cause the one or more processors to determine a score based on at least two of the temperature of the plurality of network devices, the voltage level of the plurality of network devices, or the current draw level of the plurality of network devices.

17. The non-transitory computer-readable storage media of claim 16, wherein the instructions to determine the score comprise instructions that cause the one or more processors to determine the score further based on one or more network traffic data parameters associated with the plurality of network devices.

18. The non-transitory computer-readable storage media of claim 15, wherein the instructions further cause the one or more processors to determine, based on a graph model for the network, one or more network devices of the plurality of network devices that would be affected by a failure of the particular network device where the anomaly occurs, wherein the graph model comprises nodes representing the plurality of network devices and edges representing connections between the nodes.

19. The non-transitory computer-readable storage media of claim 18, wherein the instructions further cause the one or more processors to determine a risk value associated with the anomaly based on the graph model.

20. The non-transitory computer-readable storage media of claim 15, wherein to determine the threshold for the parameter of the plurality of network devices, the instructions cause the one or more processors to determine the threshold for the parameter of the plurality of network devices using a statistical analysis to determine a baseline statistical measurement for at least one of the one or more operating characteristics of the plurality of network devices.

* * * * *